(12) United States Patent
Kane

(10) Patent No.: US 7,270,080 B1
(45) Date of Patent: Sep. 18, 2007

(54) ANIMAL TREAT DISPENSING ASSEMBLY AND METHOD

(76) Inventor: Matthew J. Kane, 3639 E. Lorrain Rd., Indianoplis, IN (US) 46220

( * ) Notice: Subject to any disclaimer, the term of this patent is extended or adjusted under 35 U.S.C. 154(b) by 63 days.

(21) Appl. No.: 11/140,046

(22) Filed: May 31, 2005

(51) Int. Cl.
*A01K 1/10* (2006.01)
(52) U.S. Cl. .................... 119/51.01; 119/51.03; 119/55; 119/702; 221/197; 221/268; 221/272
(58) Field of Classification Search ............ 119/51.01, 119/51.03, 702, 712; 221/197, 272, 268
See application file for complete search history.

(56) References Cited

U.S. PATENT DOCUMENTS

| | | | |
|---|---|---|---|
| 1,483,683 A | 2/1924 | Rush | |
| 2,447,745 A | 8/1948 | Eidson | |
| 2,791,201 A | 5/1957 | Jacob, Sr. | |
| 3,313,452 A | 4/1967 | Katz | |
| D227,927 S | 7/1973 | Gaus | |
| 5,613,464 A | 3/1997 | Petzel | |
| 6,884,186 B2 * | 4/2005 | Fluckiger et al. | 473/446 |
| 2004/0129719 A1 * | 7/2004 | Coleman et al. | 221/268 |

* cited by examiner

*Primary Examiner*—Teri Pham Luu
*Assistant Examiner*—Willie Berry, Jr.

(57) ABSTRACT

An animal treat dispensing assembly includes a base and a housing attached to and extending upwardly from the top side of the base. The housing has a front wall, a back wall, a first side wall and a second side wall. The housing has an open upper end defining a fill opening. The front wall has as dispensing opening therein. A pivot rod is positioned in the housing. A pivot member is pivotally coupled to the pivot rod. The pivot member has a top side that is planar. The top side abuts an upper edge of the dispensing opening when the top side is horizontally orientated. A panel is attached to the pivot member and extends outwardly of the dispensing opening. A plurality of animal treats is positioned in the housing, and the panel is moved downwardly so that one of the treats is dispensed outwardly through the dispensing opening.

7 Claims, 3 Drawing Sheets

ANIMAL TREAT DISPENSING ASSEMBLY AND METHOD

BACKGROUND OF THE INVENTION

1. Field of the Invention

The present invention relates to animal treat dispensing devices and more particularly pertains to a new animal treat dispensing device for holding a plurality of animal treats, such as animal biscuits, which can be dispensed upon activation of the device by an animal.

2. Description of the Prior Art

The use of animal treat dispensing devices is known in the prior art. U.S. Pat. No. 2,791,201 describes a dispensing assembly for dispensing dog biscuits to a dog upon activation by a dog. Yet another such device is found in U.S. Pat. No. 5,613,464 includes a device for dispensing out a measured amount of dog treats or food and which may actuated by a dog. A general food dispensing device is found in U.S. Pat. No. 1,483,683 which is particularly well adapted for being actuated by chickens and for dispensing chicken feed.

While these devices fulfill their respective, particular objectives and requirements, the need remains for a device that dispenses animal treat in a manner that allows an animal to actuate the device, while at the same time the device should be made to be relatively easy to fill with animal treats. Additionally, the device should have a structure which is simple in nature to ensure successful operation and inexpensive manufacturing costs.

SUMMARY OF THE INVENTION

The present invention meets the needs presented above by generally comprising a base that has a top side and a bottom side. A housing is attached to and extends upwardly from the top side of the base. The housing has a front wall, a back wall, a first side wall and a second side wall. The housing has an open upper end defining a fill opening and the front wall has a dispensing opening therein. The dispensing opening extends upwardly from a bottom edge of housing. A pivot rod is positioned in the housing and extends between the first and second side walls. The pivot rod is positioned generally adjacent to the bottom edge of the housing. A pivot member is positioned on and is pivotally coupled to the pivot rod. The pivot member has a top side, a bottom side, a front side and a back side wherein the front side extends outwardly of the dispensing opening. The top side is planar. The top side abuts an upper edge of the dispensing opening when the top side is horizontally orientated. A panel is attached to the pivot member and extends outwardly of the dispensing opening. A plurality of animal treats is positioned in the housing, and the panel is moved downwardly so that one of the treats is dispensed outwardly through the dispensing opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
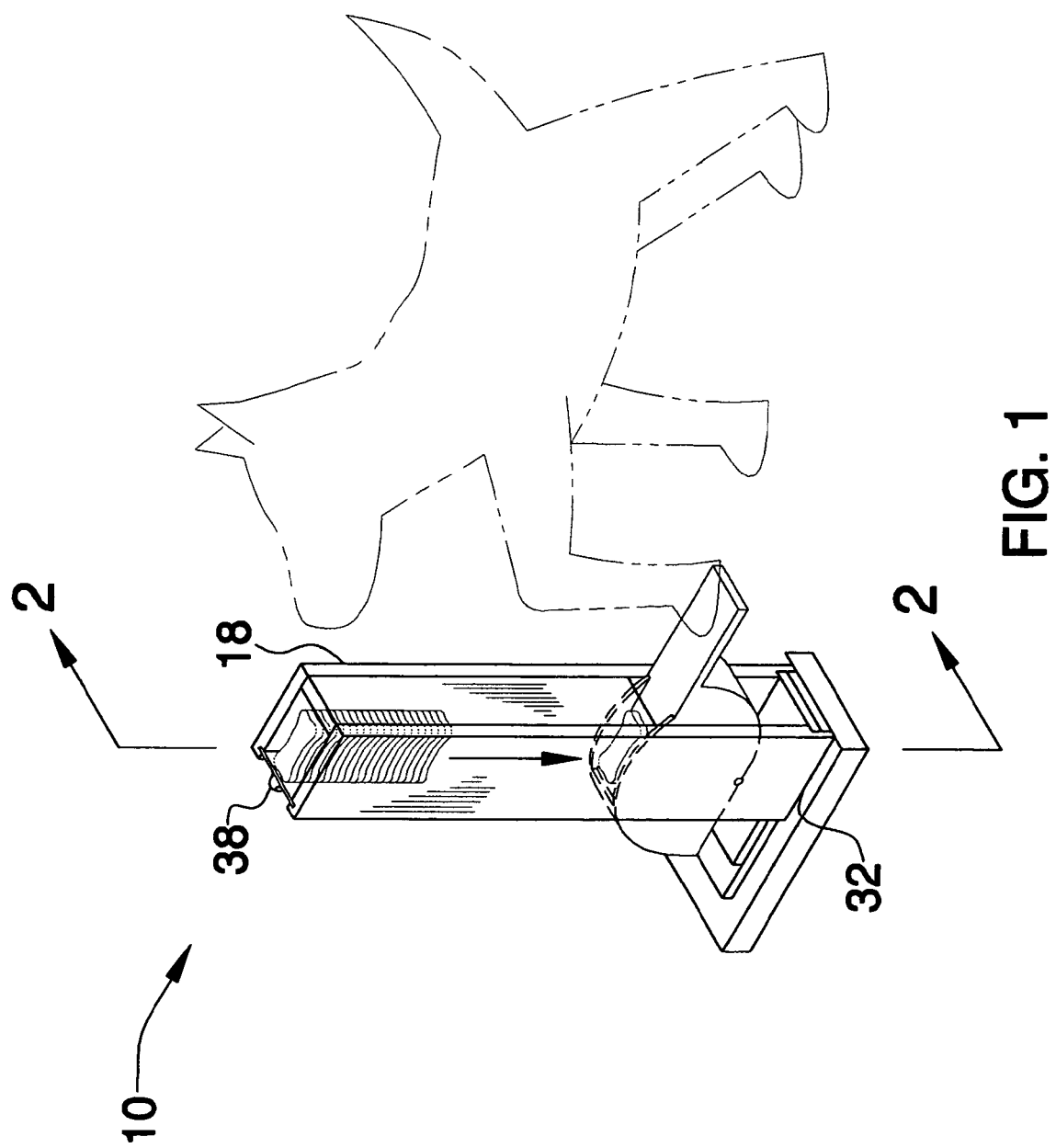
FIG. 1 is a perspective in-use view of an animal treat dispensing assembly and method according to the present invention.
Figure 2:
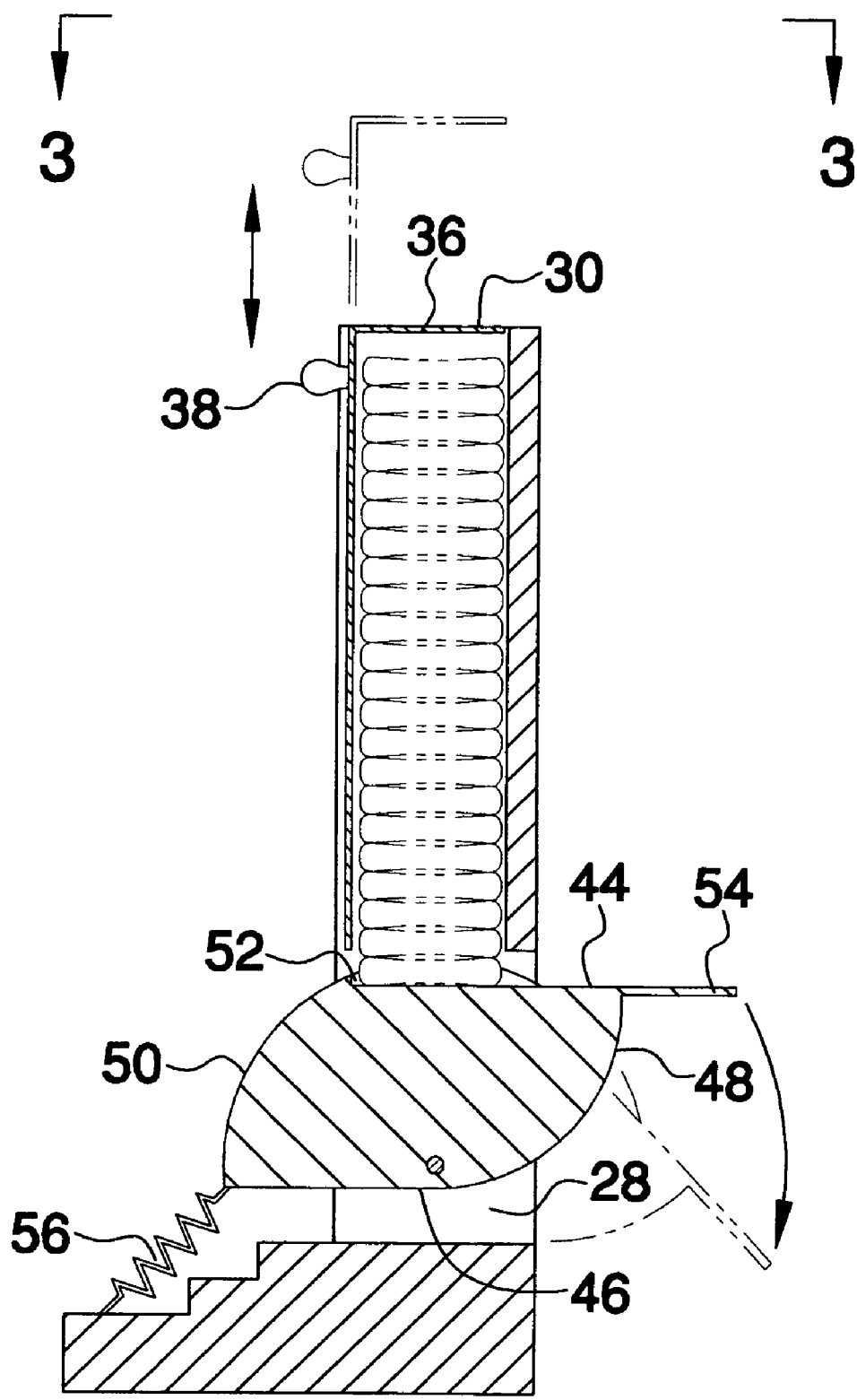
FIG. 2 is a cross-sectional view taken along line 2-2 of FIG. 1 of the present invention.
Figure 3:
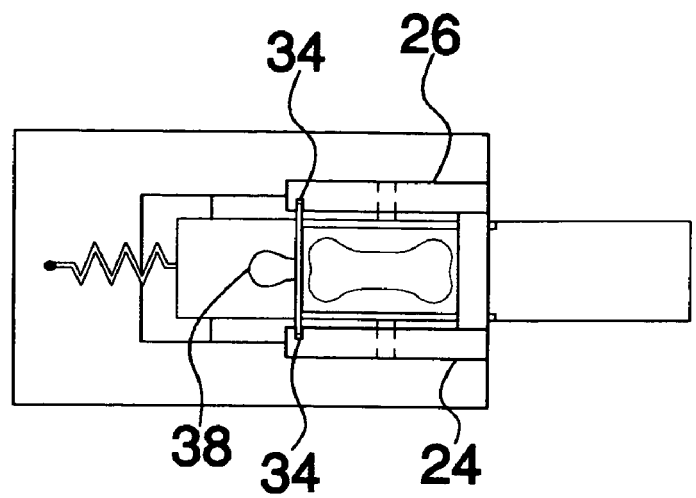
FIG. 3 is a top view taken alone line 3-3 of FIG. 2 of the present invention.
Figure 4:
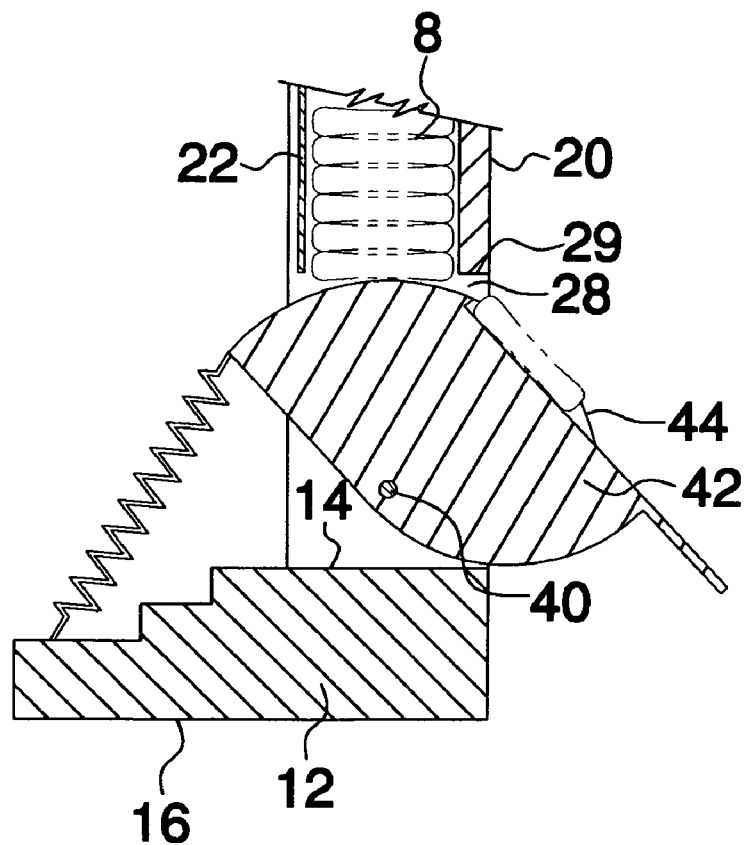
FIG. 4 is a broken side view of the present invention.

With reference now to the drawings, and in particular to FIGS. 1 through 4 thereof, a new animal treat dispensing device embodying the principles and concepts of the present invention and generally designated by the reference numeral 10 will be described.

As best illustrated in FIGS. 1 through 4, the animal treat dispensing assembly and method 10 generally comprises a base 12 that has a top side 14 and a bottom side 16. A housing 18 is attached to and extends upwardly from the top side 14 of the base 12. The housing 18 has a front wall 20, a back wall 22, a first side wall 24 and a second side wall 26. The front wall 20 has a dispensing opening 28 therein. The housing 18 has an open upper end 30 that defines a fill opening extending into the housing 18. The dispensing opening 28 extends upwardly from a bottom edge 32 of housing 18. Each of the side walls 24, 26 has a pair of vertical slots 34 therein extending from the fill opening, or upper end 30, toward the bottom edge 32. The back wall 22 is slidably mounted in the slots 34 and is selectively removable from the housing 18. A plate 36 is attached to an upper edge of the back wall 22 and is orientated perpendicular to the back wall 22. The plate 36 extends over the fill opening 30 when the back wall 22 is positioned in the slots 34 to form a cover for the housing 18. A handle 38 is attached to the back wall 22 and extends away therefrom to aid a person in removing the back wall 22 from the housing 18.

A pivot rod 40 is positioned in the housing 18 and extends between the first 24 and second 26 side walls. The pivot rod 40 is positioned generally adjacent to the bottom edge 32 of the housing 18. A pivot member 42 is positioned on and is pivotally coupled to the pivot rod 40. The pivot member 42 has a top side 44, a bottom side 46, a front side 48 and a back side 50 wherein the front side 48 extends outwardly of the dispensing opening 28. The top side 44 is planar and abuts an upper edge 29 of the dispensing opening 28 when the top side 44 is horizontally orientated. The back side 50 is convexly arcuate. A flange 52 extends upwardly from the top side 44 at a juncture of the top side 44 and the back side 50. A panel 54 is attached to the pivot member 42 and extends outwardly of the dispensing opening 28. A biasing member 56 is attached to the pivot member 42 and biases the top side 44 in a horizontal orientation abutting the upper edge 29 of the dispensing opening 28. The biasing member 56 is preferably a spring attached to the back side 50 or bottom side 46 and extended to the base 12.

In use, the back wall 22 is removed and a plurality of animal treats 8, such as animal biscuits, is positioned in the housing 18. By removing the back wall 22, the user can ensure that the treats 8 are not broken by having them dropped into the housing 18. The back wall 22 is then replaced. The panel 54 is moved downwardly so that one of the treats 8 is dispensed outwardly through the dispensing opening 28. An animal may be trained to perform this action to give themselves an animal treat.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of dispensing animal treats comprising the steps of:
   providing a base having a top side and a bottom side;
   providing a housing being attached to and extending upwardly from said top side of said base, said housing having a front wall, a back wall, a first side wall and a second side wall, said front wall having a dispensing opening therein, said housing having an open upper end defining a fill opening extending into said housing, said dispensing opening extending upwardly from a bottom edge of said housing, each of said first and second side walls has a pair of vertical slots therein extending from said fill opening toward said bottom edge, said back wall being slidably mounted in said slots and being selectively removable from said housing;
   providing a pivot rod being positioned in said housing and extending between said first and second side walls, said pivot rod being positioned generally adjacent to said bottom edge of said housing;
   providing a pivot member being positioned on and being pivotally coupled to said pivot rod, said pivot member having a top side, a bottom side, a front side and a back side wherein said front side extends outwardly of said dispensing opening, said top side being planar, said top side abutting an upper edge of said dispensing opening when said top side is horizontally orientated;
   providing a panel being attached to said pivot member and extending outwardly of said dispensing opening;
   removing said back wall;
   positioning a plurality of animal treats in said housing;
   replacing said back wall; and
   moving said panel downwardly such that one of said treats is dispensed outwardly through said dispensing opening.

2. The method according to claim 1, further providing a plate being attached to an upper edge of said back wall and being orientated perpendicular to said back wall, said plate extending over said fill opening when said back wall is positioned in said slots.

3. The method according to claim 2, further providing a handle being attached to said back wall and extending away therefrom.

4. The method according to claim 1, further providing a handle being attached to said back wall and extending away therefrom.

5. The method according to claim 1, wherein said back side is convexly arcuate.

6. The method according to claim 1, further providing a biasing member being attached to said pivot member and biasing said top side in a horizontal orientation.

7. A method of dispensing animal treats comprising the steps of:
   providing a base having a top side and a bottom side;
   providing a housing being attached to and extending upwardly from said top side of said base, said housing having a front wall, a back wall, a first side wall and a second side wall, said front wall having a dispensing opening therein, said housing having an open upper end defining a fill opening extending into said housing, said dispensing opening extending upwardly from a bottom edge of said housing, each of said side walls having a pair of vertical slots therein extending from said fill opening toward said bottom edge, said back wall being slidably mounted in said slots and being selectively removable from said housing, a plate being attached to an upper edge of said back wall and being orientated perpendicular to said back wall, said plate extending over said fill opening when said back wall is positioned in said slots;
   providing a handle being attached to said back wall and extending away therefrom;
   providing a pivot rod being positioned in said housing and extending between said first and second side walls, said pivot rod being positioned generally adjacent to said bottom edge of said housing;
   providing a pivot member being positioned on and being pivotally coupled to said pivot rod, said pivot member having a top side, a bottom side, a front side and a back side wherein said front side extends outwardly of said dispensing opening, said top side being planar, said top side abutting an upper edge of said dispensing opening when said top side is horizontally orientated, said back side being convexly arcuate;
   providing a panel being attached to said pivot member and extending outwardly of said dispensing opening;
   providing a biasing member being attached to said pivot member and biasing said top side in a horizontal orientation;
   removing said back wall;
   positioning a plurality of animal treats in said housing;
   replacing said back wall; and
   moving said panel downwardly such that one of said treats is dispensed outwardly through said dispensing opening.

* * * * *